US012154021B1

(12) United States Patent
Sternberg et al.

(10) Patent No.: US 12,154,021 B1
(45) Date of Patent: Nov. 26, 2024

(54) VISUAL SEARCH AND CONTENT DISPLAY SYSTEM

(71) Applicant: Amazon Technologies, Inc., Seattle, WA (US)

(72) Inventors: Josh Sternberg, Seattle, WA (US); Akshad Viswanathan, Seattle, WA (US); Xiaopeng Zhang, Bellevue, WA (US); Ethan Alexander Smith, Seattle, WA (US); Lenworth Richard Rose, Seattle, WA (US); Joyce Huan Fu, Seattle, WA (US); Mengyun Lv, Seattle, WA (US); Rui Chen, Bellevue, WA (US); Alexandru Indrei, Bothell, WA (US); Reece Dano, Seattle, WA (US); Saeed Salahi, Kirkland, WA (US); Anqi Liang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/578,753

(22) Filed: Jan. 19, 2022

Related U.S. Application Data

(63) Continuation of application No. 16/825,273, filed on Mar. 20, 2020, now abandoned.

(51) Int. Cl.
*G06F 16/2458* (2019.01)
*G06F 3/04817* (2022.01)
(Continued)

(52) U.S. Cl.
CPC ....... *G06N 3/0464* (2023.01); *G06F 3/04817* (2013.01); *G06F 3/0482* (2013.01);
(Continued)

(58) Field of Classification Search
CPC ............ G06F 16/2462; G06F 16/2468; G06F 16/532; G06F 16/538; G06F 16/58;
(Continued)

(56) References Cited

U.S. PATENT DOCUMENTS 10,007,946 B1 * 6/2018 Levy .................. G06Q 30/0631
10,346,901 B1 * 7/2019 Serbanescu ........ G06Q 30/0643
(Continued)

FOREIGN PATENT DOCUMENTS

JP 2021082102 A * 5/2021
KR 20200093321 A * 1/2019

OTHER PUBLICATIONS

Galitz, The Essential Guide to User Interface Design, (Wiley Computer Publishing, 2nd Ed. 2002). (Year: 2022).*
(Continued)

*Primary Examiner* — Dennis Truong
(74) *Attorney, Agent, or Firm* — K&L Gates LLP

(57) ABSTRACT

Devices and techniques are generally described for providing a graphical user interface. In some examples, first image data may be sent to a computing device, that when rendered is effective to display a first combination of items disposed together in a first environment and a first selectable control. In some examples, first data may be received indicating a selection of the first selectable control. In various examples, a first computing device may determine first feature data representing the first image data. In some examples, the first computing device may determine second image data using the first feature data. In some examples, the second image data may be sent to a second computing device. The second image data, when rendered, may be effective to display a second combination of items disposed together in a second environment.

20 Claims, 9 Drawing Sheets

(51) Int. Cl.

| | |
|---|---|
| *G06F 3/0482* | (2013.01) |
| *G06F 3/0485* | (2022.01) |
| *G06F 16/532* | (2019.01) |
| *G06F 16/538* | (2019.01) |
| *G06F 16/58* | (2019.01) |
| *G06F 18/24* | (2023.01) |
| *G06N 3/045* | (2023.01) |
| *G06N 3/0464* | (2023.01) |
| *G06N 3/08* | (2023.01) |
| *G06N 20/20* | (2019.01) |
| *G06Q 30/0601* | (2023.01) |
| *G06N 5/02* | (2023.01) |

(52) U.S. Cl.
CPC ........ *G06F 3/0485* (2013.01); *G06F 16/2468* (2019.01); *G06F 16/532* (2019.01); *G06F 16/538* (2019.01); *G06F 16/58* (2019.01); *G06F 18/24* (2023.01); *G06N 20/20* (2019.01); *G06Q 30/0631* (2013.01); *G06Q 30/0643* (2013.01); *G06N 3/045* (2023.01); *G06N 3/08* (2013.01); *G06N 5/02* (2013.01)

(58) Field of Classification Search
CPC .. G06F 3/04817; G06F 3/0482; G06F 3/0485; G06F 18/24; G06N 3/045; G06N 3/0464; G06N 3/084; G06N 20/20; G06N 3/08; G06N 5/02; G06Q 30/0631; G06Q 30/0643
See application file for complete search history.

(56) References Cited

U.S. PATENT DOCUMENTS

| | | | |
|---|---|---|---|
| 2006/0167760 A1 | 7/2006 | Chakraborty et al. | |
| 2008/0065469 A1* | 3/2008 | Specter | G06Q 30/02 705/26.7 |
| 2009/0160856 A1* | 6/2009 | Hoguet | G06T 17/00 345/420 |
| 2011/0029401 A1* | 2/2011 | Granger | G06Q 30/0623 705/26.7 |
| 2011/0218886 A1 | 9/2011 | Matsuoka et al. | |
| 2012/0231424 A1* | 9/2012 | Calman | G09B 25/04 434/72 |
| 2013/0073420 A1* | 3/2013 | Kumm | G06Q 30/0601 705/26.8 |
| 2013/0084002 A1* | 4/2013 | Bhardwaj | G06F 16/5866 382/165 |
| 2013/0254234 A1* | 9/2013 | Pierce | G06F 16/335 707/777 |
| 2014/0146082 A1* | 5/2014 | So | G06V 20/20 345/633 |
| 2014/0201028 A1* | 7/2014 | Bhardwaj | G06F 18/21 705/26.7 |
| 2014/0289069 A1* | 9/2014 | Bhardwaj | G06Q 30/0631 705/26.7 |
| 2015/0379732 A1* | 12/2015 | Sayre, III | G06T 11/001 382/164 |
| 2016/0063600 A1* | 3/2016 | Wuang | G06Q 30/0631 705/26.7 |
| 2016/0117572 A1* | 4/2016 | Bhardwaj | G06F 16/24578 382/165 |
| 2016/0300290 A1* | 10/2016 | Bhardwaj | G06Q 30/0631 |
| 2017/0147903 A1* | 5/2017 | Booth | G06V 10/462 |
| 2017/0278135 A1* | 9/2017 | Majumdar | G06V 40/10 |
| 2019/0197599 A1* | 6/2019 | Zia | G06Q 30/0631 |
| 2019/0205965 A1* | 7/2019 | Li | G06Q 30/0643 |
| 2019/0266168 A1* | 8/2019 | DiBenedetto | G06F 16/51 |
| 2019/0295151 A1* | 9/2019 | Ghadar | G06F 16/9038 |
| 2019/0354609 A1* | 11/2019 | Huang | G06F 16/532 |
| 2020/0302681 A1* | 9/2020 | Totty | G06T 15/205 |
| 2021/0019566 A1* | 1/2021 | Gandhi | G06V 20/10 |
| 2021/0272117 A1* | 9/2021 | Ene | G06Q 20/327 |
| 2023/0140225 A1* | 5/2023 | Ko | G06V 40/171 382/103 |

OTHER PUBLICATIONS

Funaki et al. JP 09138816 A "Method for Selecting and Adjusting Interior Decoration by Means of Computer Graphic Picture"; 1997-05-27 (Year: 1997).*

Lee Jong Woon; KR 20080083248 A; "Online Item Recommendation System Built Upon Users' "Like or Dislike" Choices—Based on Statistical Similarity Between Users' Choices"; Sep. 17, 2008 (Year: 2008).*

Ioannidis et al. WO 2016028494 A1 "Method for Detecting Aversion and Attraction From User Rating Data in a Recommender System" Feb. 25, 2016 (Year: 2016).*

Y. Wang, H. Wang and X. Li, "An Intelligent Recommendation System Model Based on Style for Virtual Home Furnishing in Three-Dimensional Scene," 2013 International Symposium on Computational and Business Intelligence, New Delhi, India, 2013, pp. 213-216, doi: 10.1109/ISCBI.2013.50. (Year: 2013).*

P. Reuksupasompon, M. Aruncharathorn and S. Vittayakorn, "AR Development for Room Design," 2018 15th International Joint Conference on Computer Science and Software Engineering (JCSSE), Nakhonpathom, Thailand, 2018, pp. 1-6, doi: 10.1109/JCSSE.2018.8457343. (Year: 2018).*

"Decor recommendation in a personalized environment" IP.com No. IPCOM000253066D; Publication Date: Mar. 2, 2018 (Year: 2018).*

E. Ataer-Cansizoglu et al., "Room Style Estimation for Style-Aware Recommendation," 2019 IEEE International Conference on Artificial Intelligence and Virtual Reality (AIVR), San Diego, CA, USA, 2019, pp. 267-2673, doi: 10.1109/AIVR46125.2019.00062. (Year: 2019).*

Author unknown; "'Like' or 'dislike' for instant recommendations"; Amazon.com; Retrieved from https://www.amazon.com/discover on Mar. 17, 2020; 3 pgs.

Galitz, The Essential Guide to User Interface Design, pp. 482-486 (2nd Ed. 2002) (Year: 2002).

* cited by examiner

VISUAL SEARCH AND CONTENT DISPLAY SYSTEM

CROSS-REFERENCE TO RELATED APPLICATIONS

This application is a continuation of and claims priority to U.S. patent application Ser. No. 16/825,273, filed Mar. 20, 2020, the disclosure of which is incorporated herein by reference in its entirety.

BACKGROUND

Online retail systems allow customers to search product databases during online shopping. Customers typically search for products using search terms related to the product. Online retail systems sometimes allow users to filter search results so that only those search results matching user-defined criteria are displayed. Photographs of products are typically shown from a variety of different views so that customers can view the product from different angles. Product detail pages often provide additional detail regarding the products such as user reviews, product specifications, pricing, product colors, delivery time, etc.

DETAILED DESCRIPTION

Figure 1:
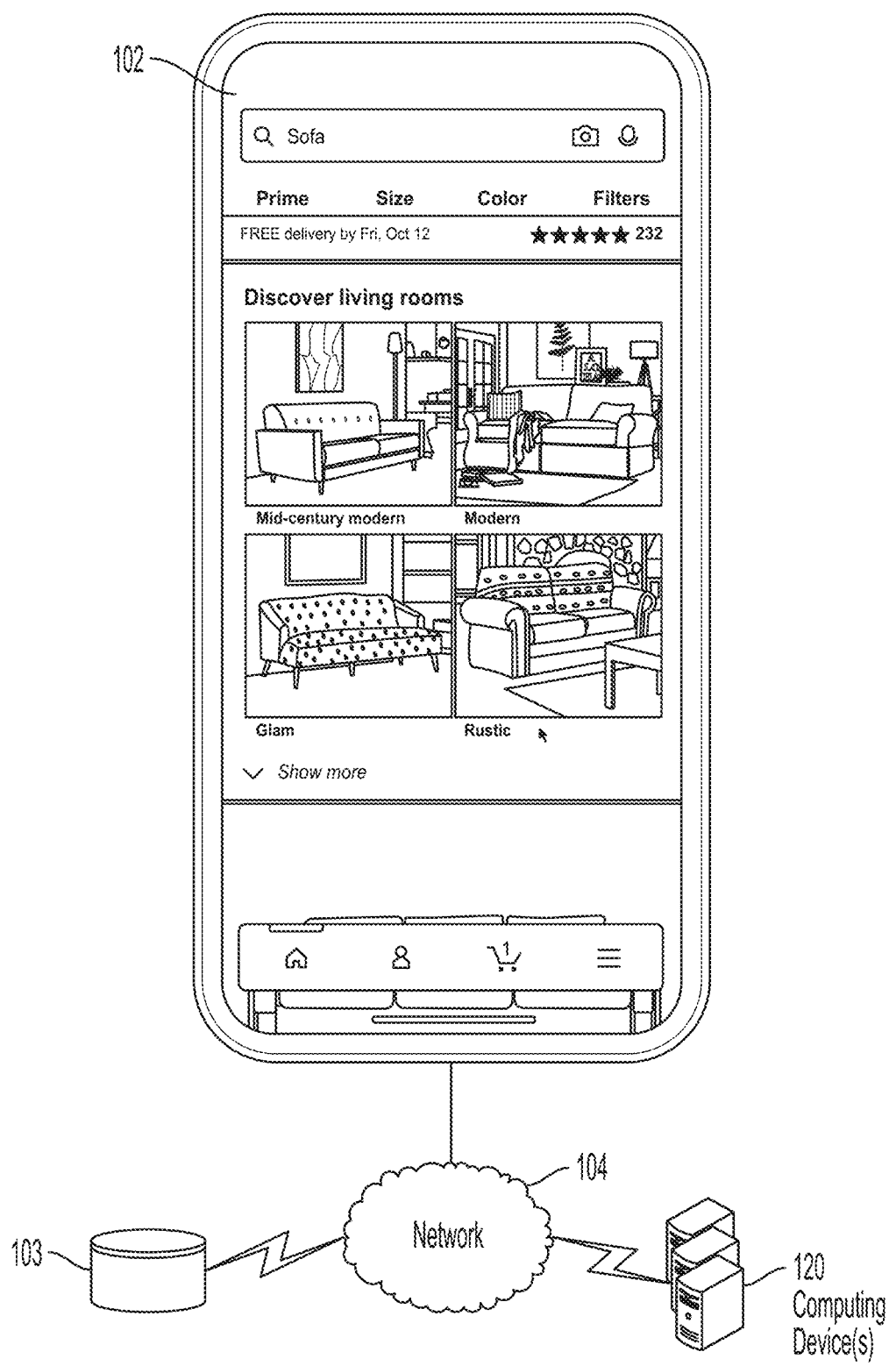
FIG. 1 is a diagram depicting a graphical user interface displaying ensembles of content, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

During online search, such as search of an online retail site, search terms (e.g., text) are often used to find content of interest to a user. However, users may not know the appropriate terminology to use to search for the content for which the user is seeking. In some other examples, a user may desire to see a product as it will be presented while in use. For example, seeing a chair depicted in front of a blank white background may not provide the context desired by the user for purchase of the chair. The user may wish to see the chair depicted as a part of a decorated room, for example.

In an embodiment described herein, a visual search system is presented. The visual search system provides a graphical user interface (GUI) on which the user can see content and/or an ensemble of content that conforms to user-specified attributes. An ensemble of content may be, for example, a combination of items arranged together in an environment. For example, an ensemble of content may be an image depicting multiple items of furniture arranged together in a room. The user can be presented with a "feed" of content that conforms to the user-specified attributes. The (GUI) provides selectable controls (e.g. graphical control elements) that the user can select to like and/or dislike images. Disliked images are replaced within the feed by images that are visually dissimilar to the disliked image, but which include the user-specified attributes. Selection of a selectable control may cause a control input to be executed by an operating system executing the GUI. The control input may cause the operating system to perform one or more actions that may cause various actions to take place and/or various reconfigured views of the GUI to be displayed, as described herein.

In another embodiment described herein, users are able to select images of ensembles of content (e.g., objects of different types) in order to receive more information regarding the content displayed within the ensemble. For example, a user may select a room (or other environment) from a user's feed depicting various pieces of furniture. The GUI can display an image of the room and simultaneously display enlarged images of pieces of furniture depicted within the room or pieces of furniture similar to the pieces depicted within the room. For example, a user is able to select a room from the user's feed. Enlarged images of the pieces of furniture within the room (or pieces of furniture that are determined to be visually similar to the pieces of furniture within the room) are displayed on the GUI while simultaneously the GUI simultaneously displays the image of the room. Selectable graphical controls are displayed on the enlarged images of the furniture to allow the user to see similar pieces relative to the piece of furniture displayed in the enlarged image. Upon selection of the graphical control, images of furniture that have been determined to be visually similar to the piece depicted in the enlarged image are displayed while simultaneously displaying both the enlarged image and the room image. The user is able to select graphical controls for each of these items to like or dislike the items. Disliked items are replaced by visually dissimilar items that have the attributes of the item displayed in the enlarged image. Further, filters are displayed in conjunction with the items to allow the user to change the attribute set of the items being displayed. For example, filters can be provided to alter the dimensions of the set of items being displayed, the color, the style, the seating capacity, the price, whether or not the item qualifies for free delivery, etc.

In another embodiment, the user can select tags (e.g., selectable icons) in the room display that correspond to displayed items within the room. For example, a first icon may be displayed on a sofa within the room and a second icon may be displayed on a lamp in the room. The user may select the tag corresponding to the lamp. Upon selection of the tag, an enlarged image of the lamp is displayed on the GUI in conjunction with the image of the room. The enlarged image of the lamp provides improved visibility of the product and also optionally provides additional details such as price, dimensions, and/or selectable graphical controls allowing the user to see similar items. Next, the user may select the tag displayed on the sofa. In response, the enlarged image switches (e.g., performs a scrolling operation) from the lamp to an enlarged image of the sofa.

Conversely, in another embodiment, the user is able to scroll through enlarged images of items displayed in the room in a separate portion of the GUI. The tag associated with the item that is currently displayed as an enlarged image may change appearance (e.g., change color, animate to jiggle or shake, etc.) in order to draw the users attention to the corresponding item within the image of the room. As the user scrolls through different images of enlarged items, the corresponding tags within the room image can change appearance to highlight the location of the item within the room.

In various embodiments, machine learning approaches may be used to determine visual similarity (and dissimilarity) between content. For example, machine learning classifiers may be trained to detect one or more classes of objects within input images. The machine learning classifiers may generate bounding boxes and/or segmentation masks that identify the image data corresponding to different classes of objects. Thereafter, a machine learning model (e.g., an encoder convolutional neural network (CNN), etc.) may learn feature data describing the visual nature of each detected object. The feature data may be stored in databases and/or other data structures and may be queried during user interaction with the GUI. For example, a user can select a graphical control associated with a lamp that says "See similar." Upon selection of the graphical control, the feature data describing the visual nature of the lamp may be retrieved from memory. Additionally, various filter attributes selected by the user can be determined. For example, the user may currently have selected "mid-century modern" as a "style" and may have selected a particular price range. Thereafter, the systems described herein may determine a set of items that have the smallest distance in the feature space from the selected item, that also satisfy the filter constraints. That is to say, the systems may determine a set of items with item-type "lamp" that are tagged as "mid-century modern" style, that satisfy the specified price range, and which are associated with the smallest distance in the feature space from the selected lamp.

In another embodiment described herein, images of ensembles of items can be selected automatically using an image classification model. The image classification model is a machine learning model trained to determine whether images are of sufficient quality and provide sufficient item detail to be selected for display within a feed on the GUI, as described herein. In an example implementation, the image classification model generates quality scores for input images. One or more threshold quality scores can be used to select images for a feed. Upon selection, the aforementioned CNN classifier is used to detect various objects within the image.

Any suitable input image data may be used for a user feed. Significantly, the image data used for a user feed need not include images of products available for sale through the online retailer providing the GUI. For example, a high quality image of a living room set may be used in a user's feed. Pieces of furniture shown in the living room set may not be available for sale via the online retailer. However, a machine learning approach may be used to identify and determine a feature embedding for different items depicted within the living room set. Thereafter, the feature embedding can be compared with features determined for items available for sale through the online retailer. Accordingly, a closest match to the depicted item may be found within the online retailer's product catalog and displayed. As known to those of ordinary skill in the art, the closest match may be a product with a feature that has a minimum distance in the feature space to the relevant the feature embedding of the depicted product. In various examples, instead of the product with a feature that has a minimum distance in the feature space, a product with a feature that is within some tolerance of the minimum distance (e.g., 10%, 5%, or any other suitable value) may be selected.

Machine learning techniques are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model may be referred to as back propagation.

FIG. 1 is a diagram depicting a GUI 102 displaying ensembles of content, according to various embodiments of the present disclosure. As depicted in FIG. 1, computing device(s) 120 (e.g., one or more servers) may include at least one non-transitory computer-readable memory 103 and/or may be configured in communication with non-transitory computer-readable memory 103, such as over network 104. In various examples, network 104 may represent a local area network (LAN) and/or a wide area network (WAN) such as the internet. In various examples, the at least one non-transitory computer-readable memory 103 may store instructions that, when executed by at least one processor may be effective to perform the various operations and/or display the GUI 102, as described in further detail below.

As depicted in FIG. 1, GUI 102 may display an option to view an ensemble of content. For example, in FIG. 1, GUI 102 displays the text "Discover living rooms" and displays four images of different styles of living rooms immediately below the Discover living rooms text. In the example depicted, each of the four depicted living rooms is associated with a different style. For example, the top-left most living room image is associated with the "Mid-century modern" style, the top-right most living room image is associated with the "Modern" style, the bottom-right most living room image is associated with the "Rustic" style, and the bottom left-most living room image is associated with the "Glam" style.

In various examples, a user may select one of the images in order to see ensembles of content of the appropriate style, type, and/or other attribute. In the example depicted in FIG. 1, the user may select the "Rustic" image data in order to see a feed (e.g., a scrollable series of images) of living rooms tagged with metadata that indicates the living rooms have a rustic style. Additionally, in the example depicted in FIG. 1, the user may select the drop-down menu "Show more" to see additional room styles and/or other types of content ensembles. Although, the furniture example is discussed herein, it should be appreciated that the various techniques and graphical user interfaces described herein are equally applicable to other types of content that is displayable in a larger environment and/or within an ensemble of content. For example, clothing, food, art, etc.

Figure 2:
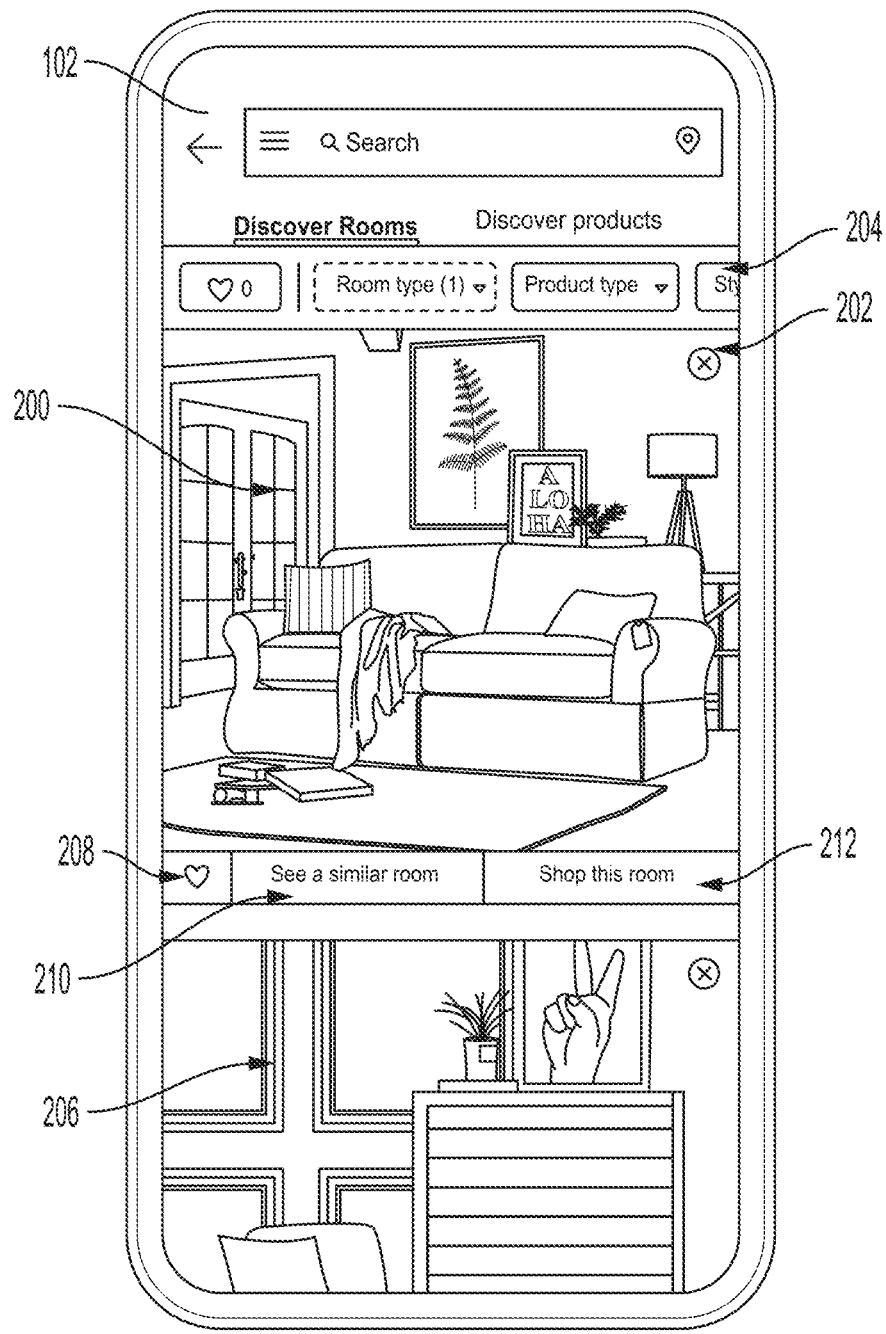
FIG. 2 depicts the graphical user interface of FIG. 1 displaying selected content ensembles, in accordance with various aspects of the present disclosure.

FIG. 2 depicts the GUI 102 displaying selected content ensembles, in accordance with various aspects of the present disclosure. After selection of one of the living room images and/or other images of ensembles of content the GUI 102 may display a feed (e.g., a scrollable set of images) of image data corresponding to the selected content. In the example depicted in FIG. 2, the user may have selected "Modern" living rooms. Accordingly, the GUI 102 may display a feed of images tagged with metadata indicating that the images are of a type "living room," and a style "modern." In the example depicted, image 200 displays a first living room and image 206 displays a second living room. The user may scroll up or down to see additional living rooms.

Additionally, the GUI 102 may include filters 204. The filters 204 may allow the user to specify a set of attributes (one or more attributes) for the images displayed in the feed. For example, the user may select a product type (e.g., sofa) and a style (e.g., rustic). Accordingly, each image in the feed may comprise an object tagged with the metadata identifying the object as a product type "sofa" and as a product style "rustic." In the example depicted in FIG. 2, the filters 204 include the drop down menu "Room type." A user may select a different room type (e.g., kitchen, bathroom, office, etc.) in order to change the image data displayed in the feed to image data including "room type" metadata identifying the image data as pertaining to the selected room type.

In addition, each image in the feed depicted in FIG. 2 may include a selectable control 202, a selectable control 208, a selectable control 210, and/or a selectable control 212. Selectable control 202 (sometimes referred to as a "dislike" or "cancel" button) may be effective to remove the image from the feed. In an example, a user may select the selectable control 202 when the user does not like the image (e.g., if the user does like the style of the furniture). Upon selection of selectable control 202, feature data (e.g., a feature vector) visually representing the image (e.g., determined by a CNN and/or other encoder machine learning network) may be determined. In various examples, such feature data may be determined prior to displaying an image on the GUI 102 and may be stored in a database and/or other data structure. Thereafter, computing device(s) 120 may determine an image associated with a feature vector that has a maximum distance (or a distance above a threshold distance and/or a distance within a tolerance of the maximum distance (e.g., 5%, 10% or some other suitable value)) in the feature space from the feature vector representing the disliked image (e.g., the image for which selectable control 202 was selected), from among a set of images satisfying the attributes specified using filters 204.

For example, a user may have selected the attributes Room_type=living room, style=glam, and product_type=sofa. The user may receive a feed of images with the attributes selected using filters 204. Thereafter, the user may select selectable control 202 for an image that the user does not like. Upon selection of selectable control 202 computing device(s) 120 may determine a feature vector visually representing the image associated with the selected selectable control 202. Computing device(s) 120 may determine an image from among the images satisfying the selected attributes (Room_type=living room, style=glam, and product_type=sofa) that has a feature vector that is a maximum distance (or a distance above a threshold distance and/or varying from the maximum distance by a suitable tolerance percentage) from the feature vector visually representing the disliked image. The disliked image (e.g., the image for which selectable control 202 was selected) may be replaced within the feed by the new image. The reason for determining an image with a feature vector that is most different (or with a distance in the feature space that is above a threshold distance) from the disliked image is to show the user another example image that satisfies the set of attributes selected by the user and that is different from the image that the user disliked.

Similarly, a user may select selectable control 210 if a user wants to see a similar ensemble of content. For example, if the image 200 (depicting a living room) is appealing to the user, the user may wish to select selectable control 210 to see a similar room. Thereafter, feature data (e.g., a feature vector) visually representing the image (e.g., determined by a CNN and/or other encoder machine learning network) may be determined. In various examples, the feature data may be determined prior to displaying an image on the GUI 102 and may be stored in a database and/or other data structure. Computing device(s) 120 may determine an image associated with a feature vector that has a minimum distance (or a distance below a threshold distance) in the feature space from the feature vector representing the current image (e.g., the image for which selectable control 210 was selected), from among a set of images satisfying the attributes specified using filters 204.

For example, a user may have selected the attributes Room_type=kitchen, style=modern, and product_type=refrigerator. In response, the user receives a feed of displayed images with the attributes selected using filters 204. Thereafter, the user may select selectable control 210 in order to see kitchens similar to the currently-displayed kitchen. Upon selection of selectable control 210, computing device(s) 120 determines a feature vector visually representing the image associated with the selected selectable control 210. Computing device(s) 120 determine an image from among the images satisfying the selected attributes (Room_type=kitchen, style=modern, and product_type=refrigerator) that has a feature vector that is a minimum distance (or a distance below a threshold distance) from the feature vector visually representing the current image. The new image can be inserted directly below, directly above, and/or in place of the image for which the selectable control 210 was selected. The reason for determining an image with a feature vector that is most similar to (or with a distance in the feature space that is below a threshold distance) from the image is to show the user another example image that satisfies the set of attributes selected by the user and that is similar to the current image.

In an example, selectable control 208 allows a user to save the current ensemble of content (e.g., a room of furniture) for later viewing. In an example embodiment, selection of selectable control 212 causes the GUI to transition from the feed of content ensembles depicted in FIG. 2 to a content display where the user is able to receive additional detail regarding individual items of content (e.g., pieces of furniture) within the ensemble. For example, selection of selectable control 212 can cause the GUI to transition to the display depicted in FIG. 3 or FIG. 4.

Figure 3:
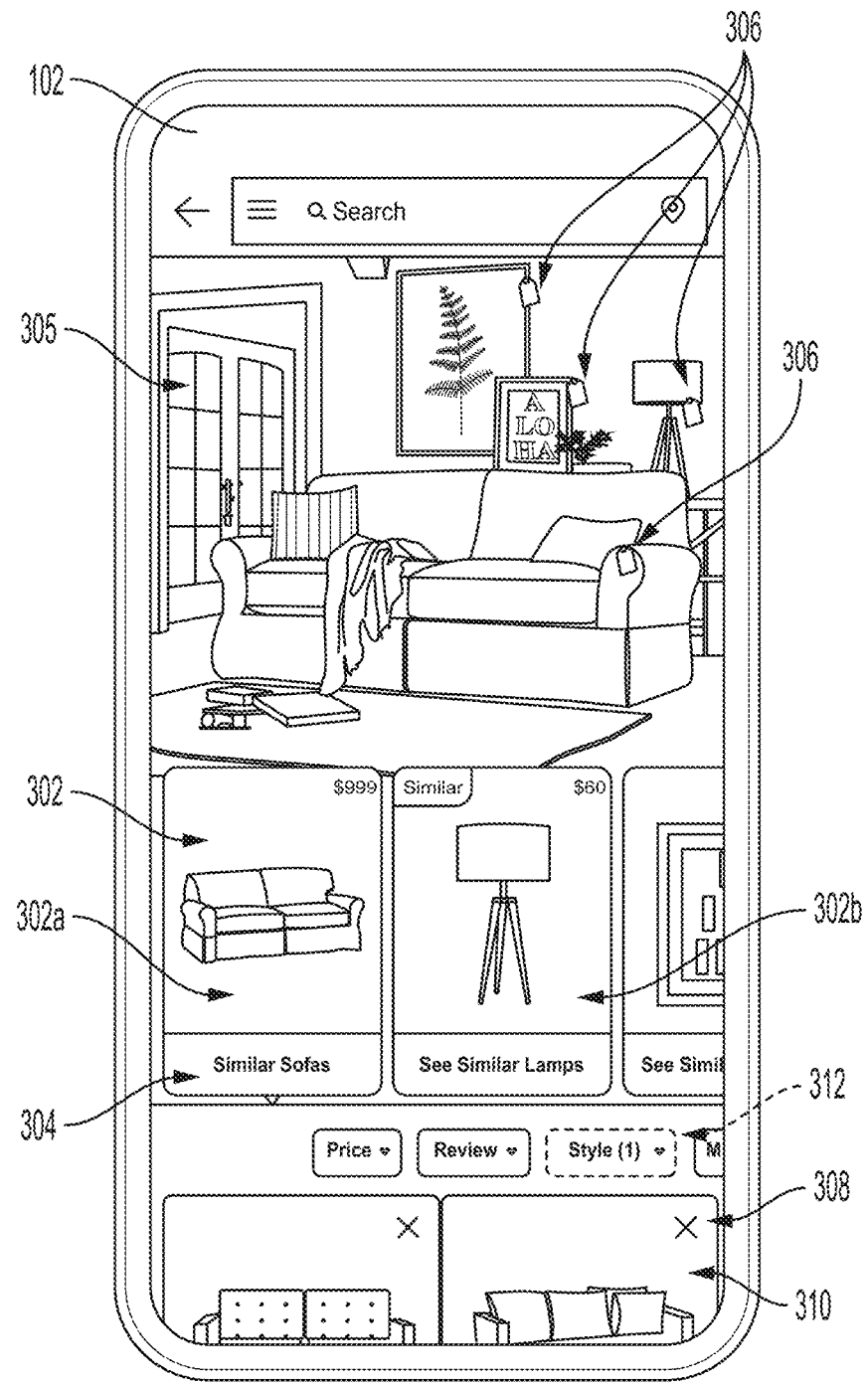
FIG. 3 depicts the graphical user interface of FIGS. 1 and 2 displaying enlarged versions of content in conjunction with the content ensemble, in accordance with various aspects of the present disclosure.

FIG. 3 depicts the GUI 102 displaying enlarged versions of content in conjunction with the content ensemble, in accordance with various aspects of the present disclosure. Upon selection of selectable control 212 (FIG. 2), GUI 102 can display enlarged images 302 representing different content either visually similar to or identical to content that is displayed within the content ensemble image 305.

When selectable control 212 is selected, computing device(s) 120 determines objects recognized within the image. As described in further detail below, the various content ensemble images displayed in a feed may be processed using an object recognition machine learning model to identify classes of objects represented in the image data for which the machine learning model has been trained to detect. Additionally, in some example embodiments, the object recognition machine learning model generates bounding boxes and/or segmentation masks identifying groupings of pixels in the image data that correspond to a detected object. The object recognition machine learning model generates feature embeddings (e.g., feature vectors) visually representing the objects in a feature space. If the objects pertain to objects present in an online catalog (e.g., for an online retailer), the feature embeddings may be stored in at least one non-transitory computer-readable memory (e.g., non-transitory computer-readable memory 103) in association with label data describing characteristics of the object/product (e.g., object type=sofa, object style=mid-century modem, object_color=purple, object_cost=$649.99, etc.).

Enlarged images 302 (including enlarged image 302a, enlarged image 302b, etc.) of the objects detected are displayed in conjunction with the content ensemble image 305. Users may scroll through the enlarged images 302 to see enlarged versions of the different objects displayed in content ensemble image 305. In the example, depicted in FIG. 3, a user may horizontally scroll through the enlarged images 302 (although the enlarged images may be displayed in other manners, in accordance with the particular implementation).

Selectable control 304 may be selected for particular enlarged image to see similar content to the particular enlarged image. For example, a user can select selectable control 304 on enlarged image 302a to see sofas that are visually similar to the sofa displayed in content ensemble image 305 (as determined by searching for sofa images with a low distance in the feature space from the feature vector representing the sofa displayed in content ensemble image 305). Upon selection of selectable control 304, filters 312 are displayed so that a user can specify attributes that the similar content should include.

Examples of the filters 312 can include a minimum review score, a maximum and/or minimum price, availability of free delivery, style, brand, color, height, width, depth, weight, etc. Thereafter, images 310 may be displayed showing content that is visually similar (in the relevant feature space) to the content for which selectable control 304 was selected. In addition, a selectable control 308 (e.g., a dislike button) may be displayed that the user may select to remove the image and to display visually dissimilar content that still satisfies the attributes specified using filters 312. Visually dissimilar content may be determined as described above. Additionally, although not shown in FIG. 3, each of the images 310 can include a selectable control that causes content similar to that image 310 to be shown. Upon selection, content that is visually similar to the object for which the "see similar" selectable control has been selected is displayed for the images 310. In an example, selection of a "see similar" button for an individual image 310 can cause a row (or a single image, or multiple rows) of similar content to be displayed adjacent to (e.g., just below) the image for which the "see similar" control was selected.

As shown in FIG. 3, icons 306 (e.g., tags and/or other graphical indicators) can be displayed on top of (or otherwise associated with) individual content shown in content ensemble image 305. In at least some examples, selection of an icon 306 may cause the GUI to display an interface as shown in FIG. 4.

Figure 4:
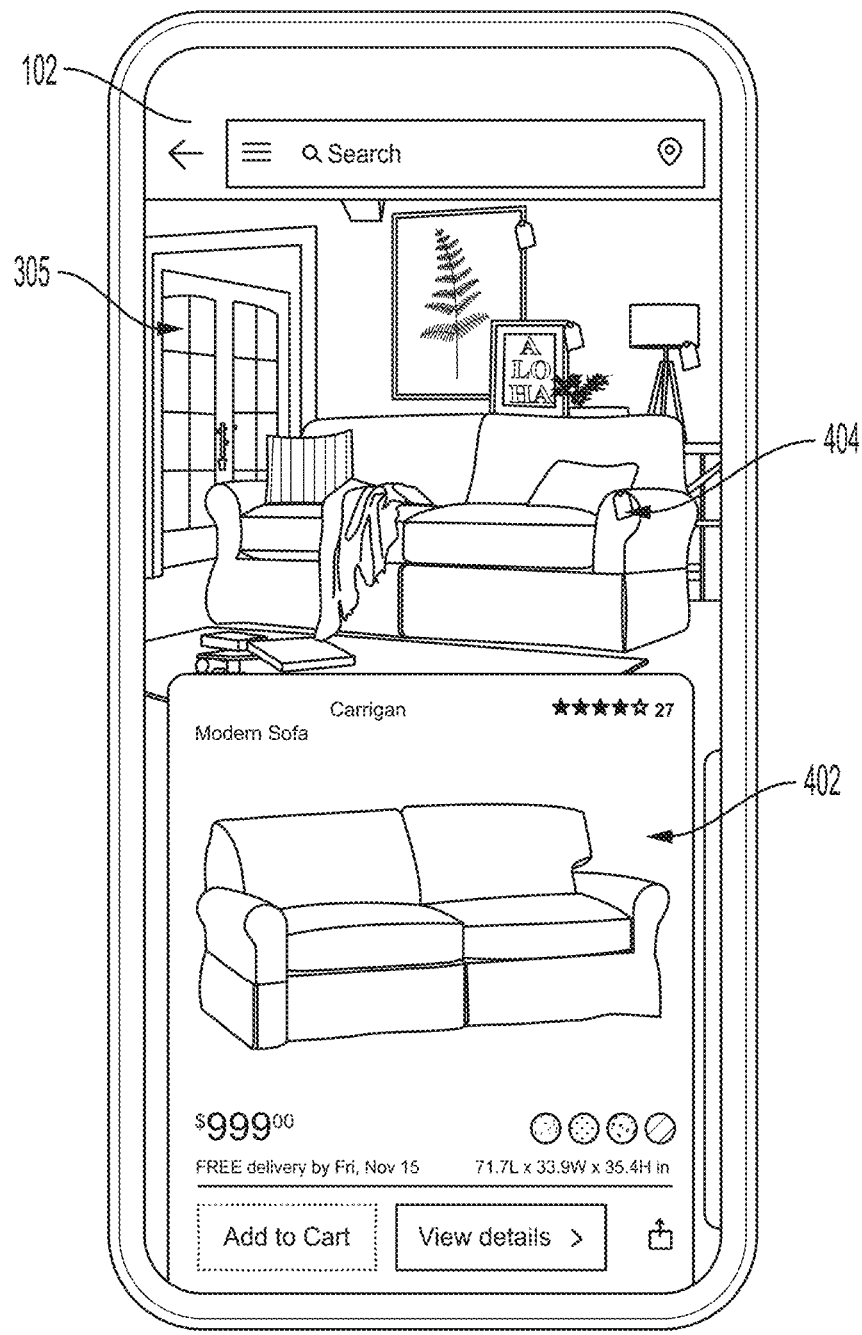
FIG. 4 depicts an example of the graphical user interface of FIGS. 1-3, with additional details, in accordance with various aspects of the present disclosure.

FIG. 4 depicts an example of the GUI 102, with additional details, in accordance with various aspects of the present disclosure. Upon selection of an icon 404 in the content ensemble image 305, an enlarged image 402 of the content associated with the icon 404 is displayed (e.g., in place of enlarged images 302 and/or 310, but in conjunction with the content ensemble image 305. The enlarged image 402 includes additional details about the content selected using the icon 404. In the example depicted in FIG. 4, the enlarged image 402 may show average user ratings of the sofa, a name of the product, a price, colors, dimensions, an ability to add the product to a shopping cart, etc. The selected icon 404 may change appearance (e.g., change color, animate, vibrate or move, etc.) to indicate that the icon 404 has been selected.

Figure 5:
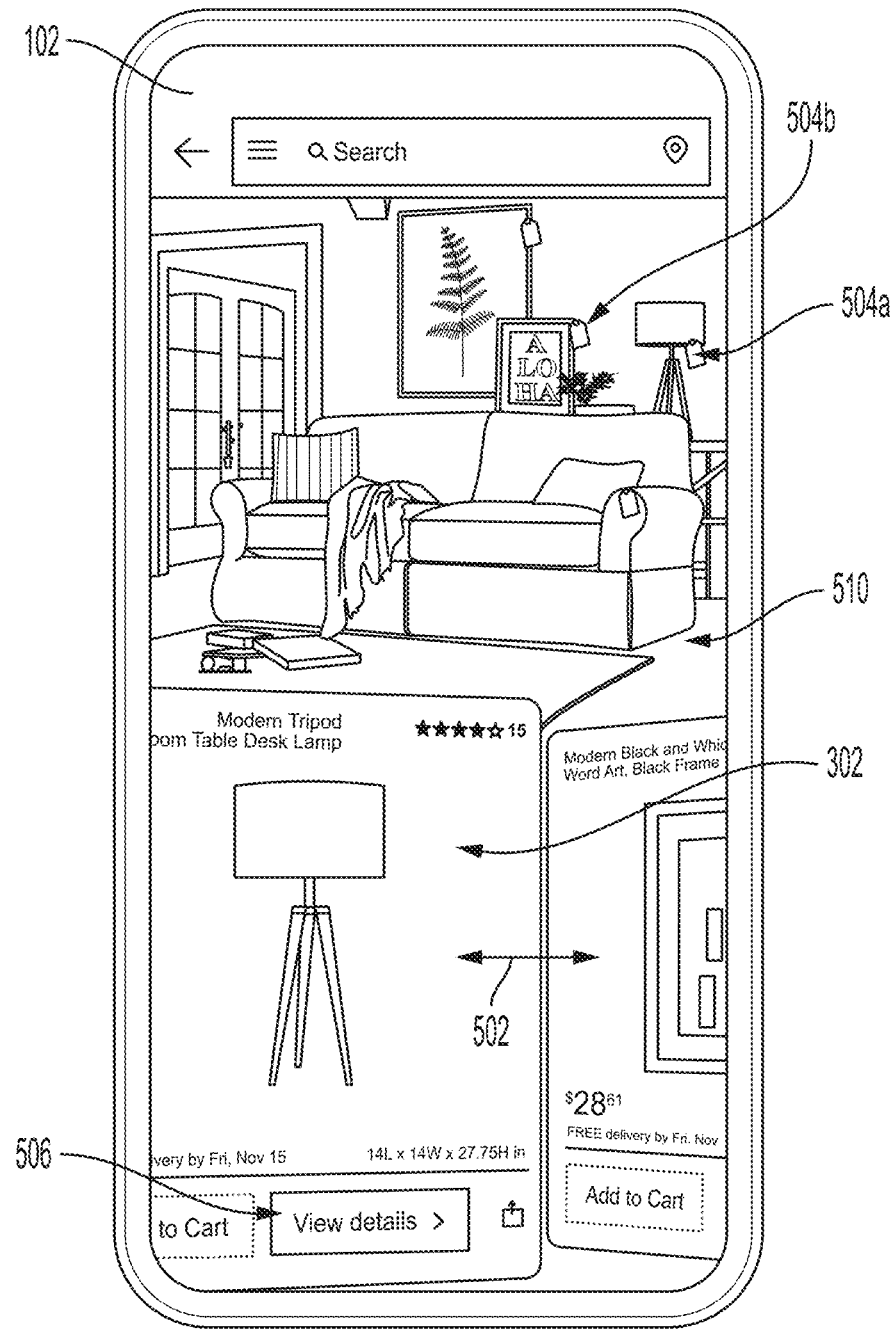
FIG. 5 depicts an example of the graphical user interface of FIGS. 1-4, with additional details, in accordance with various aspects of the present disclosure.

As shown in FIG. 5, a user may scroll (or otherwise navigate) through the enlarged images (depicted as a horizontal scroll operation 502 in FIG. 5) in order to see enlarged images of the objects displayed in the content ensemble image 305 (or at least the content that is associated with icons). As each enlarged image is displayed, the corresponding icon 504 may change appearance to draw the user's attention to appropriate image data within the content ensemble image 305. Accordingly, as the user scrolls from the lamp image to the framed picture image, the icon 504a associated with the lamp image may return to a nominal color (e.g., white) and/or state and the icon 504b associated with the framed picture may change appearance to highlighted state (e.g., a bright color, an animated icon, etc.). Additionally, as previously described, the user can select the icons to directly navigate to an enlarged image representing the content. Additionally, as previously described, the enlarged images of content may not be identical to the content in the content ensemble image 305. For example, an item displayed in the content ensemble image 305 (e.g., a chair) may not be available for sale from an online retailer. Accordingly, an enlarged image of the chair with additional details may not be available for enlarged display. Instead, the computing device(s) 120 may determine the most visually similar chair (as described above) available for sale and display an enlarged image of the visually similar chair.

Figure 6:
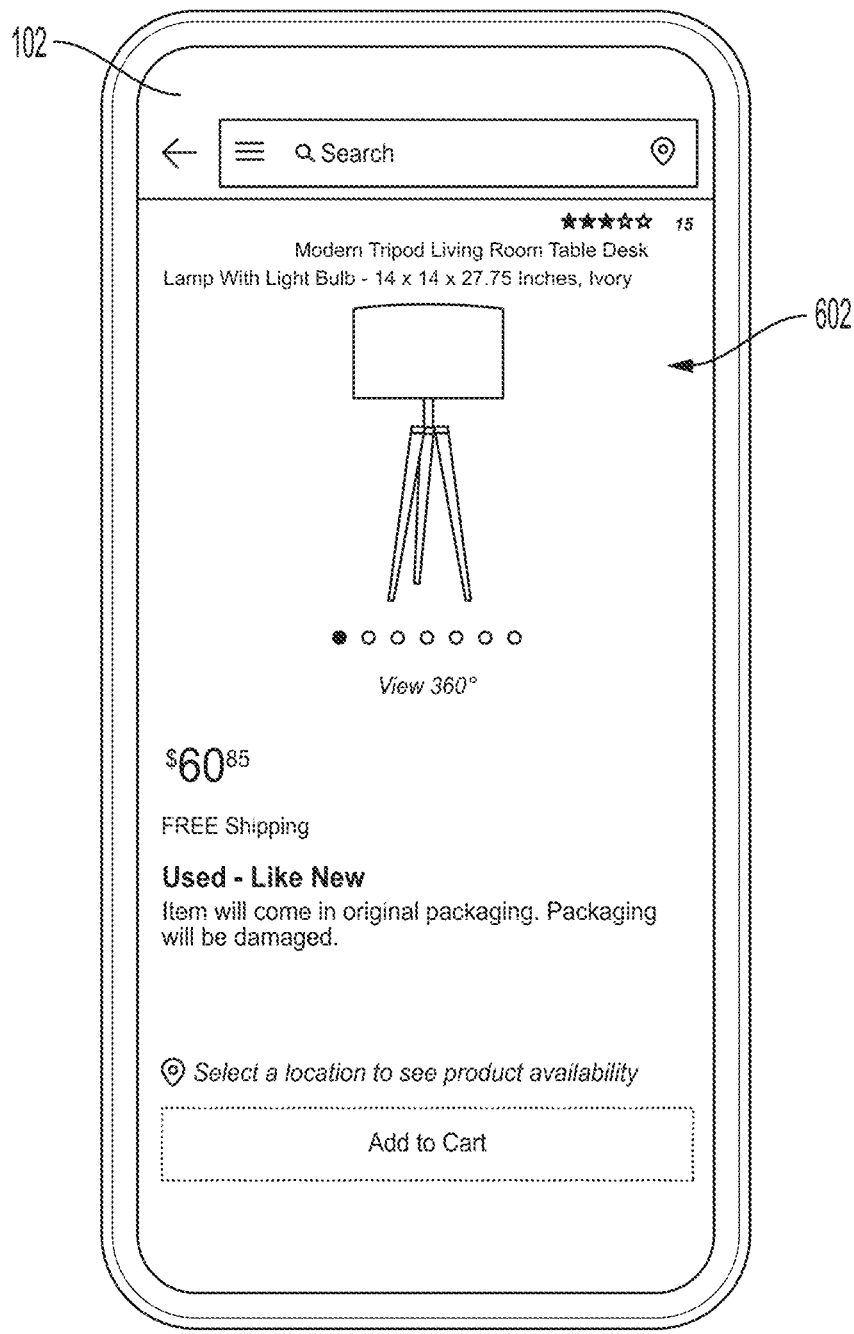
FIG. 6 depicts a content detail page, in accordance with various aspects of the present disclosure.

In another example embodiment, selection of selectable control 510 may return the user to an interface similar to the interface depicted in FIG. 3. Selection of an enlarged image (e.g., enlarged images 402, 310) may transition the user interface to a detail page as shown in FIG. 6. Similarly, selection of a "more details" button and/or a similar selectable control (such as selectable control 506) may transition the GUI 102 to the content detail page shown in FIG. 6. Detail page 602 of FIG. 6 may display additional details regarding selected content and may provide purchase functionality (e.g., an "Add to Cart" button), price, and/or other details.

Figure 7:
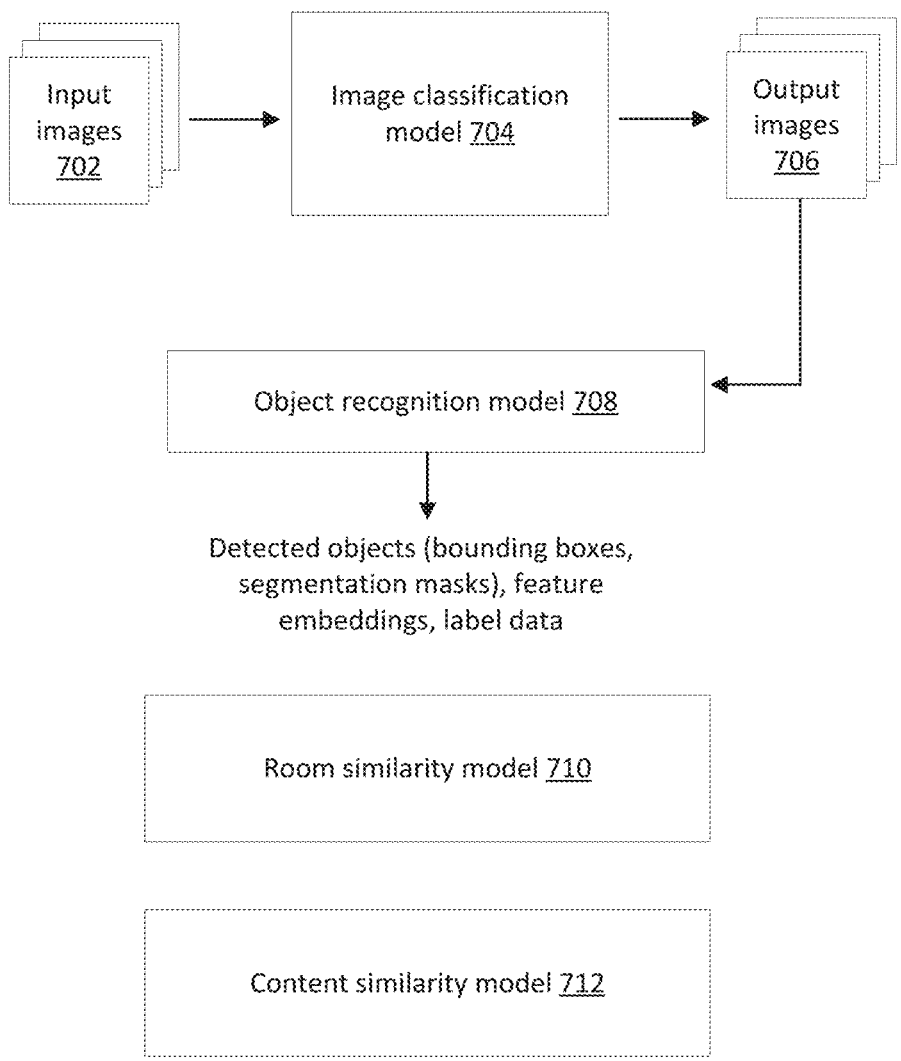
FIG. 7 depicts examples of machine learning models that may be used in accordance with the present disclosure.

FIG. 7 depicts examples of machine learning models that may be used in accordance with the present disclosure.

Upon selection of a selectable control on GUI 102 (e.g., selectable control 210, 212, etc.), data indicating that the pertinent selectable control was selected may be sent from the computing device displaying the GUI 102 to computing device(s) 120 (e.g., one or more servers). For example, if selectable control 210 (e.g., a "See a similar room" button), the computing device(s) 120 may determine feature data associated with the image data of the room for which the selectable control 210 was selected. The feature data may have been previously-computed using one or more of the machine learning models described below in reference to FIG. 7 and may be stored in a memory in association with the image data of the room. Thereafter, in response to selection of the selectable control 210, the computing device(s) 120 may determine a different image (e.g., of a second room) that is associated with feature data that is the closest (e.g., in Euclidean distance) to the feature of the displayed room. As previously described, in some examples, the different image may be selected from among a set of images that satisfies the currently-selected attribute values specified using filters 204. As such, the set of attributes may be sent from the computing device displaying GUI 102 to the computing device(s) 120.

In the current example, after determination of the similar image data of the second room, the computing device(s) 120 may send data (e.g., executable code and/or image data) to the computing device displaying GUI 102 effective to cause the GUI 102 to display the image data of the second room.

In an example embodiment, an image classification model is used to determine content ensemble images that may be used as part of a feed of content ensemble images (e.g., the feed of content ensemble images depicted in FIG. 2. Although content ensemble images may be specifically staged and photographed, in some examples, the images used as content ensemble images may be sourced from third party sellers (e.g., third party sellers selling products through an e-commerce website), from users (e.g., from user reviews showing a product as displayed by the user), and/or from other available image repositories. Use of images from such wide-ranging sources to allow a user to visually search for content of interest may use some form of quality control to ensure that the images are of a high enough quality to be both useful and aesthetically pleasing.

Accordingly, image classification model 704 may be trained to determine quality scores for input images. In various examples, image classification model 704 may be trained in a supervised manner using image data labeled with quality scores. After training, input images 702 (e.g., input content ensemble images) may be input into the image classification model 704. The image classification model 704 may output per-image quality scores. The per-image quality scores may be used to determine a set of output images 706. For example, the output images 706 may comprise those input images 702 with a quality score above a predetermined threshold quality score value.

In another example embodiment, the output images 706 that have been determined to be of sufficient quality are sent to an object recognition model 708. Object recognition model 708 may be a convolutional neural network (CNN) trained to recognize and classify objects represented within image data. In various examples, the object recognition model 708 is trained to generate bounding boxes and/or segmentation masks identifying the objects. Additionally, the object recognition model 708 may generate label data and/or other metadata describing the recognized objects. For example, the object recognition model 708 may generate label data describing an object as a sofa and describing a style of the sofa as contemporary and a color of the sofa as gray. In at least some further examples, the object recognition model 708 may determine feature embeddings (e.g., feature vectors) for each detected object and may be effective to determine a most similar and/or most dissimilar object in a catalog and/or object repository by determining an object with the most similar and/or most dissimilar feature embedding.

In some example implementations, a room similarity model 710 is used. Room similarity model 710 generates a feature representation of an output image 706 (e.g., of a content ensemble image). For example, room similarity model 710 may determine a feature representation describing an image of a living room. The room similarity model 710 may also be used to determine the most similar content ensemble images by finding a closest feature representation among other output images 706 (e.g., by finding an output image 706 with a feature representation that is closest in the feature space). As previously described, if a user selects "See similar rooms" on the GUI 102, the room similarity model 710 may determine the most similar rooms (in the relevant feature space) among those rooms having the parameters selected by the user using filters 204. Users may also see dissimilar rooms (furthest from the current room in the feature space) that satisfy the currently selected parameters specified using the filters 204.

Similarly, a content similarity model 712 is used in some implementations. Content similarity model 712 generates a feature representation of an individual object detected in an image. For example, content similarity model 712 may determine a feature representation describing a table detected in an image of a living room. The content similarity model 712 may also be used to determine the most similar content within a content repository by finding a closest feature representation among other content available in an online catalog. For example, content similarity model may find another table with a feature representation that is closest in the feature space to the currently-displayed table. As previously described, if a user selects "See similar items" on the GUI 102 in reference to the table, the content similarity model 712 may determine the most similar items (in the relevant feature space) among those items having the parameters selected by the user using filters 312. Users may also see dissimilar items (furthest from the current item in the feature space) that satisfy the currently selected parameters specified using the filters 312.

Figure 8:
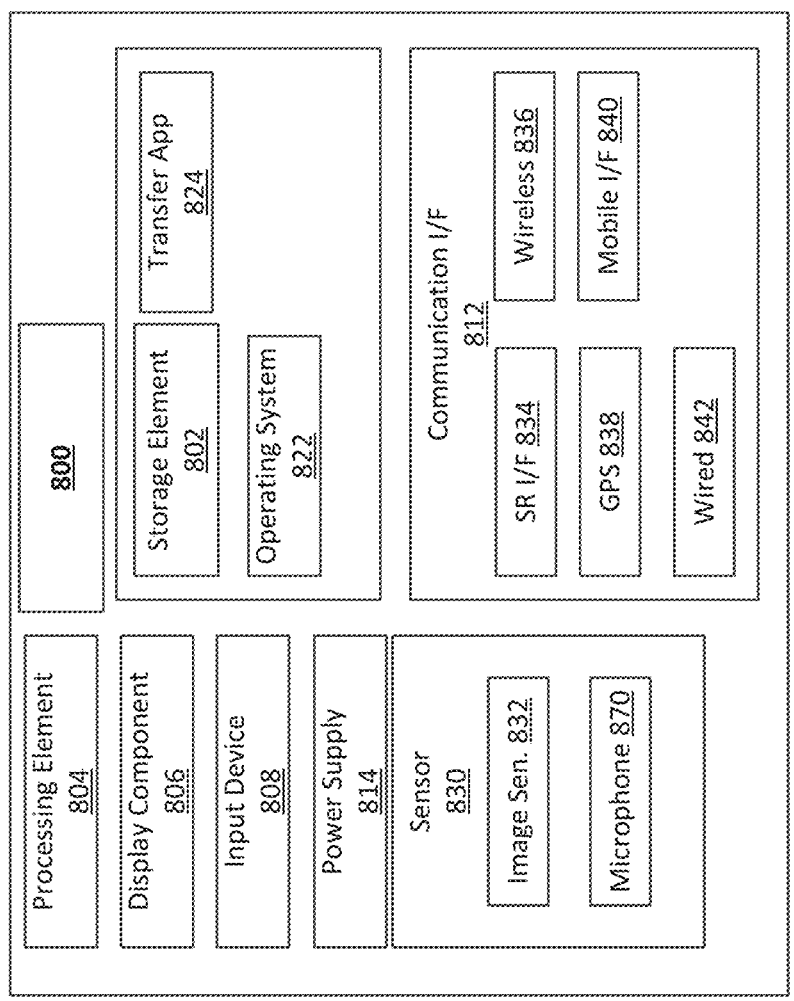
FIG. 8 is a block diagrams showing an example architecture of a computing device that may be used in accordance with various embodiments described herein.

FIG. 8 is a block diagram showing an example architecture 800 of a computing device that may be used to generate the graphical user interfaces and/or the machine learning models described herein, in accordance with various aspects of the present disclosure. It will be appreciated that not all devices will include all of the components of the architecture 800 and some user devices may include additional components not shown in the architecture 800. The architecture 800 may include one or more processing elements 804 for executing instructions and retrieving data stored in a storage element 802. The processing element 804 may comprise at least one processor. Any suitable processor or processors may be used. For example, the processing element 804 may comprise one or more digital signal processors (DSPs). The storage element 802 can include one or more different types of memory, data storage, or computer-readable storage media devoted to different purposes within the architecture 800. For example, the storage element 802 may comprise flash memory, random-access memory, disk-based storage, etc. Different portions of the storage element 802, for example, may be used for program instructions for execution by the processing element 804, storage of images or other digital works, and/or a removable storage for transferring data to other devices, etc. Additionally, storage element 802 may store parameters, and/or machine learning models generated using the various techniques described herein.

The storage element 802 may also store software for execution by the processing element 804. An operating system 822 may provide the user with an interface for operating the computing device and may facilitate communications and commands between applications executing on the architecture 800 and various hardware thereof. A transfer application 824 may be configured to receive images, audio, and/or video from another device (e.g., a mobile device, image capture device, and/or display device) or from an image sensor 832 and/or microphone 870 included in the architecture 800.

When implemented in some user devices, the architecture 800 may also comprise a display component 806. The display component 806 may comprise one or more light-emitting diodes (LEDs) or other suitable display lamps. Also, in some examples, the display component 806 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 806 may be effective to display input images and/or the GUI 102 generated in accordance with the various techniques described herein.

The architecture 800 may also include one or more input devices 808 operable to receive inputs from a user. The input devices 808 can include, for example, a push button, touch pad, touch screen, wheel, joystick, keyboard, mouse, trackball, keypad, light gun, game controller, or any other such device or element whereby a user can provide inputs to the architecture 800. These input devices 808 may be incorporated into the architecture 800 or operably coupled to the architecture 800 via wired or wireless interface. In some examples, architecture 800 may include a microphone 870 or an array of microphones for capturing sounds, such as voice requests. In various examples, audio captured by microphone 870 may be streamed to external computing devices via communication interface 812.

When the display component 806 includes a touch-sensitive display, the input devices 808 can include a touch sensor that operates in conjunction with the display component 806 to permit users to interact with the image displayed by the display component 806 using touch inputs (e.g., with a finger or stylus). The architecture 800 may also include a power supply 814, such as a wired alternating current (AC) converter, a rechargeable battery operable to be recharged through conventional plug-in approaches, or through other approaches such as capacitive or inductive charging.

The communication interface 812 may comprise one or more wired or wireless components operable to communicate with one or more other computing devices. For example, the communication interface 812 may comprise a wireless communication module 836 configured to communicate on a network, such as the network 104, according to any suitable wireless protocol, such as IEEE 802.11 or another suitable wireless local area network (WLAN) protocol. A short range interface 834 may be configured to communicate using one or more short range wireless protocols such as, for example, near field communications (NFC), Bluetooth, Bluetooth LE, etc. A mobile interface 840 may be configured to communicate utilizing a cellular or other mobile protocol. A Global Positioning System (GPS) interface 838 may be in communication with one or more earth-orbiting satellites or other suitable position-determining systems to identify a position of the architecture 800. A wired communication module 842 may be configured to communicate according to the USB protocol or any other suitable protocol.

The architecture 800 may also include one or more sensors 830 such as, for example, one or more position sensors, image sensors, and/or motion sensors. An image sensor 832 is shown in FIG. 8. Some examples of the architecture 800 may include multiple image sensors 832. For example, a panoramic camera system may comprise multiple image sensors 832 resulting in multiple images and/or video frames that may be stitched and may be blended to form a seamless panoramic output. An example of an image sensor 832 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s) 120, as described herein, are exemplary, and may be located as a stand-alone device or may be included, in whole or in part, as a component of a larger device or system.

Figure 9:
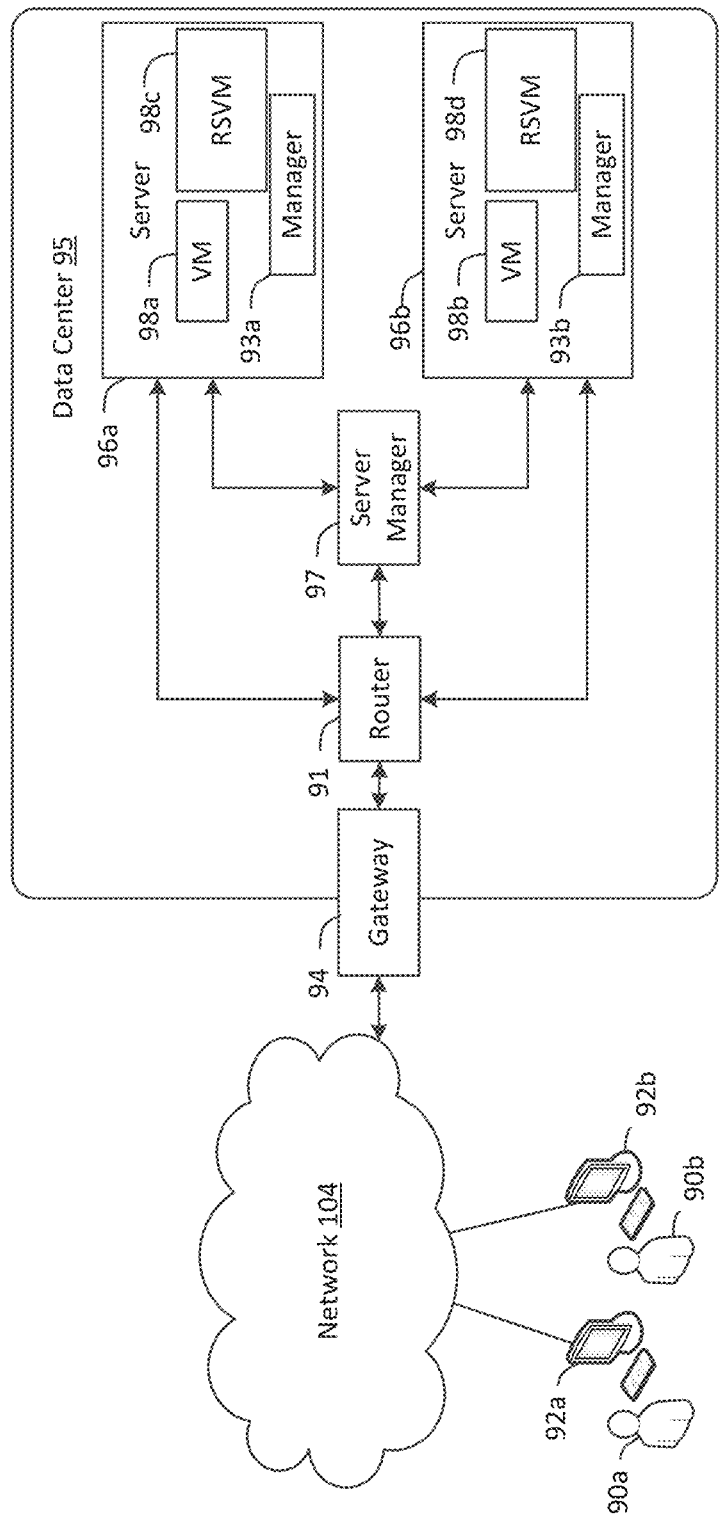
FIG. 9 is a diagram illustrating an example system for sending and providing data that may be used in accordance with the present disclosure.

An example system for sending and providing data will now be described in detail. In particular, FIG. 9 illustrates an example computing environment in which the embodiments described herein may be implemented. For example, the computing environment of FIG. 9 may be used to provide the various machine learning models described herein as a service over a network wherein one or more of the techniques described herein may be requested by a first computing device and may be performed by a different computing device configured in communication with the first computing device over a network. FIG. 9 is a diagram schematically illustrating an example of a data center 95 that can provide computing resources to users 90a and 90b (which may be referred herein singularly as user 90 or in the plural as users 90) via user computers 92a and 92b (which may be referred herein singularly as user computer 92 or in the plural as user computers 92) via network 104. Data center 95 may be configured to provide computing resources for executing applications on a permanent or an as-needed basis. The computing resources provided by data center 95 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 95 may include servers 96a and 96b (which may be referred herein singularly as server 96 or in the plural as servers 96) that provide computing resources. These resources may be available as bare metal resources or as virtual machine instances 98a-d (which may be referred herein singularly as virtual machine instance 98 or in the plural as virtual machine instances 98). In at least some examples, server manager 97 may control operation of and/or maintain servers 96. Virtual machine instances 98c and 98d are rendition switching virtual machine ("RSVM") instances. The RSVM virtual machine instances 98c and 98d may be configured to perform all, or any portion, of the techniques for improved rendition switching and/or any other of the disclosed techniques in accordance with the present disclosure and described in detail above. As should be appreciated, while the particular example illustrated in FIG. 9 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 92. User computers 92 may be computers utilized by users 90 or other customers of data center 95. For instance, user computer 92a or 92b may be a server, a desktop or laptop personal computer, a tablet computer, a wireless telephone, a personal digital assistant (PDA), an e-book reader, a game console, a set-top box or any other computing device capable of accessing data center 95. User computer 92a or 92b may connect directly to the Internet (e.g., via a cable modem or a Digital Subscriber Line (DSL)). Although only two user computers 92a and 92b are depicted, it should be appreciated that there may be multiple user computers.

User computers 92 may also be utilized to configure aspects of the computing resources provided by data center 95. In this regard, data center 95 might provide a gateway or web interface through which aspects of its operation may be configured through the use of a web browser application program executing on user computer 92. Alternately, a stand-alone application program executing on user computer 92 might access an application programming interface (API) exposed by data center 95 for performing the configuration operations. Other mechanisms for configuring the operation of various web services available at data center 95 might also be utilized.

Servers 96 shown in FIG. 9 may be servers configured appropriately for providing the computing resources described above and may provide computing resources for executing one or more web services and/or applications. In one embodiment, the computing resources may be virtual machine instances 98. In the example of virtual machine instances, each of the servers 96 may be configured to execute an instance manager 93a or 93b (which may be referred herein singularly as instance manager 93 or in the plural as instance managers 93) capable of executing the virtual machine instances 98. The instance managers 93 may be a virtual machine monitor (VMM) or another type of program configured to enable the execution of virtual machine instances 98 on server 96, for example. As discussed above, each of the virtual machine instances 98 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 95 shown in FIG. 9, a router 91 may be utilized to interconnect the servers 96a and 96b. Router 91 may also be connected to gateway 94, which is connected to network 104. Router 91 may be connected to one or more load balancers, and alone or in combination may manage communications within networks in data center 95, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 95 shown in FIG. 9, a data center 95 is also employed to at least in part direct various communications to, from and/or between servers 96a and 96b. While FIG. 9 depicts router 91 positioned between gateway 94 and data center 95, this is merely an exemplary configuration. In some cases, for example, data center 95 may be positioned between gateway 94 and router 91. Data center 95 may, in some cases, examine portions of incoming communications from user computers 92 to determine one or more appropriate servers 96 to receive and/or process the incoming communications. Data center 95 may determine appropriate servers to receive and/or process the incoming communications based on factors such as an identity, location or other attributes associated with user computers 92, a nature of a task with which the communications are associated, a priority of a task with which the communications are associated, a duration of a task with which the communications are associated, a size and/or estimated resource usage of a task with which the communications are associated and many other factors. Data center 95 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 95 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems that support various interpreted or compiled programming languages such as Ruby, Perl, Python, C, C++ and the like or high-performance computing systems) suitable for the applications, without, for example, requiring the client to access an instance or an execution system directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware system, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   sending first instructions, from a first computing device to a second computing device, to cause first image data to be displayed, wherein the first image data, when rendered, is effective to display:
   a first image depicting a first combination of items arranged together in a first environment; and
   a first selectable control associated with the first image data;
   receiving first data indicating a selection of the first selectable control;
   determining, by the first computing device based at least in part on the receiving the first data indicating the selection of the first selectable control, first feature vector data associated with a machine learning feature space, wherein the first feature vector data is generated by an encoder and visually represents the first image data;
   determining, by the first computing device, second image data using the first feature vector data based at least in part on the selection of the first selectable control;
   sending second instructions, from the first computing device to the second computing device, to cause the second image data to be displayed by the second computing device based at least in part on the selection of the first selectable control, wherein the second image data, when rendered is effective to display a second image depicting a second combination of items arranged together in a second environment;
   determining, using an object recognition machine learning model, a first subset of the second image data corresponding to a first item of the second combination of items and a second subset of the second image data corresponding to a second item of the second combination of items;

generating, by the object recognition machine learning model based at least in part on detection of the first subset of the second image data, a first feature embedding for the first subset of the second image data visually representing the first item; and generating, by the object recognition machine learning model based at least in part on detection of the second subset of the second image data, a second feature embedding for the second subset of the second image data visually representing the second item.

2. The method of claim 1, further comprising:

determining the second image data by determining a distance between the first feature vector data and second feature vector data associated with the second image data in the machine learning feature space of the first feature vector data and the second feature vector data; and determining that the distance is a within a tolerance of a minimum distance among image data stored in a repository of image data.

3. The method of claim 1, further comprising:

determining the second image data by determining a distance between the first feature vector data and second feature vector data associated with the second image data in the machine learning feature space of the first feature vector data and the second feature vector data; and determining that the distance is within a tolerance of a maximum distance among image data stored in a repository of image data.

4. The method of claim 1, further comprising:

receiving a selection of a set of attributes for items associated with the second image data;

receiving a control input effective to dismiss a third item of the second combination of items;

displaying a different item in place of the third item, wherein the different item includes the set of attributes; and modifying the first feature vector data based at least in part on the different item.

5. The method of claim 4, further comprising determining that second feature vector data representing the different item has a distance in the machine learning feature space that is within a tolerance of a maximum distance from a fourth feature vector data representing the third item among a set of items including the set of attributes.

6. The method of claim 1, wherein the first image data, when rendered is effective to further display a first icon associated with a first item of the first combination of items, the method further comprising:

receiving data indicating a selection of the first icon; and sending third image data that, when rendered, is effective to display an enlarged image of the first item.

7. The method of claim 1, wherein the first image data, when rendered is effective to further display:

a first icon associated with a first item of the first combination of items;

a second icon associated with a second item of the first combination of items; and scrollable enlarged images of each item of the first combination of items, wherein the scrollable enlarged images are displayed on a different part of the display relative to the first combination of items arranged together in the first environment;

the method further comprising:

receiving first data indicating a selection of the first item in the scrollable enlarged images; and sending second data to the second computing device effective to cause the first icon to change from a first appearance to a second appearance.

8. The method of claim 7, further comprising:

receiving third data indicating a scroll operation from the first item in the scrollable enlarged images to the second item in the scrollable enlarged images;

sending fourth data to the second computing device effective to cause the first icon to change from the second appearance to the first appearance; and sending fifth data to the second computing device effective to cause the second icon to change from the first appearance to the second appearance.

9. The method of claim 1, wherein the encoder comprises a convolutional neural network, the method further comprising:

determining, using the convolutional neural network, the first feature vector data visually representing the first combination of items as arranged together in the first environment;

determining, using a second convolutional neural network, second feature vector data visually representing a first item of the first combination of items, wherein the object recognition machine learning model comprises the second convolutional neural network;

storing the first feature vector data in at least one non-transitory computer-readable memory in association with the first image data; and storing the second feature vector data in the at least one non-transitory computer-readable memory in association with third image data representing the first item.

10. The method of claim 1, further comprising:

determining that an enlarged representation of the first item is currently displayed by the second computing device; and modifying an appearance of a graphical tag associated with the first item in the second image data in response to the enlarged representation of the first item being currently displayed.

11. The method of claim 1, wherein the first image depicts the first combination of items arranged together within a room.

12. A system, comprising:

at least one processor; and at least one non-transitory computer-readable memory storing instructions that, when executed by the at least one processor, are effective to program the at least one processor to:

send first instructions to a first computing device, the first instructions effective to cause first image data to be displayed, wherein the first image data, when rendered, is effective to display:

a first image depicting a first combination of items arranged together in a first environment; and a first selectable control associated with the first image data;

receive first data indicating a selection of the first selectable control;

determine, based at least in part on receipt of the first data indicating the selection of the first selectable control, first feature vector data associated with a machine learning feature space, wherein the first feature vector data is generated by an encoder and visually represents the first image data;

determine second image data using the first feature vector data based at least in part on the selection of the first selectable control;

send second instructions to the first computing device, the second instructions effective to cause the second image data to be displayed based at least in part on the selection of the first selectable control, wherein the second image data, when rendered is effective to display a second image depicting a second combination of items arranged together in a second environment;

determine, using an object recognition machine learning model, a first subset of the second image data corresponding to a first item of the second combination of items and a second subset of the second image data corresponding to a second item of the second combination of items;

generate, by the object recognition machine learning model based at least in part on detection of the first subset of the second image data, a first feature embedding for the first subset of the second image data visually representing the first item; and generate by the object recognition machine learning model based at least in part on detection of the second subset of the second image data, a second feature embedding for the second subset of the second image data visually representing the second item.

13. The system of claim 12, storing further instructions that, when executed by the at least one processor, are further effective to program the at least one processor to:

determine the second image data by determining a distance between the first feature vector data and second feature vector data associated with the second image data in the machine learning feature space of the first feature vector data and the second feature vector data; and determine that the distance is a within a tolerance of a minimum distance among image data stored in a repository of image data.

14. The system of claim 13, storing further instructions that, when executed by the at least one processor, are further effective to program the at least one processor to:

determine the second image data by determining a distance between the first feature vector data and second feature vector data associated with the second image data in the machine learning feature space of the first feature vector data and the second feature vector data; and determine that the distance is a within a tolerance of a maximum distance among image data stored in a repository of image data.

15. The system of claim 12, storing further instructions that, when executed by the at least one processor, are further effective to program the at least one processor to:

receive a selection of a set of attributes for items associated with the second image data;

receive a control input effective to dismiss a third item of the second combination of items; and display a different item in place of the third item, wherein the different item includes the set of attributes.

16. The system of claim 15, storing further instructions that, when executed by the at least one processor, are further effective to program the at least one processor to determine that second feature vector data representing the different item has a distance in the machine learning feature space that is within a tolerance of a maximum distance from a fourth feature vector data representing the third item among a set of items including the set of attributes.

17. The system of claim 12, wherein the first image data, when rendered is effective to further display a first icon associated with a first item of the first combination of items, the at least one non-transitory computer-readable memory storing further instructions that, when executed by the at least one processor, are further effective to program the at least one processor to:

receive data indicating a selection of the first icon; and
send third image data that, when rendered, is effective to display an enlarged image of the first item.

18. The system of claim 12, wherein the first image data, when rendered is effective to further display:

a first icon associated with a first item of the first combination of items;

a second icon associated with a second item of the first combination of items; and scrollable enlarged images of each item of the first combination of items, wherein the scrollable enlarged images are displayed on a different part of the display relative to the first combination of items arranged together in the first environment;

wherein the at least one non-transitory computer-readable memory storing further instructions that, when executed by the at least one processor, are further effective to program the at least one processor to:

receive first data indicating a selection of the first item in the scrollable enlarged images; and send second data to the first computing device effective to cause the first icon to change from a first appearance to a second appearance.

19. The system of claim 18, storing further instructions that, when executed by the at least one processor, are further effective to program the at least one processor to:

receive third data indicating a scroll operation from the first item in the scrollable enlarged images to the second item in the scrollable enlarged images;

send fourth data to the first computing device effective to cause the first icon to change from the second appearance to the first appearance; and send fifth data to the first computing device effective to cause the second icon to change from the first appearance to the second appearance.

20. The system of claim 12, storing further instructions that, when executed by the at least one processor, are further effective to program the at least one processor to:

determining that an enlarged representation of the first item is currently displayed by the first computing device; and modifying an appearance of a graphical tag associated with the first item in the second image data in response to the enlarged representation of the first item being currently displayed.

* * * * *